Oct. 12, 1965 P. M. McPHERSON 3,211,049
ULTRAVIOLET MONOCHROMATOR
Filed Sept. 17, 1962 5 Sheets-Sheet 3
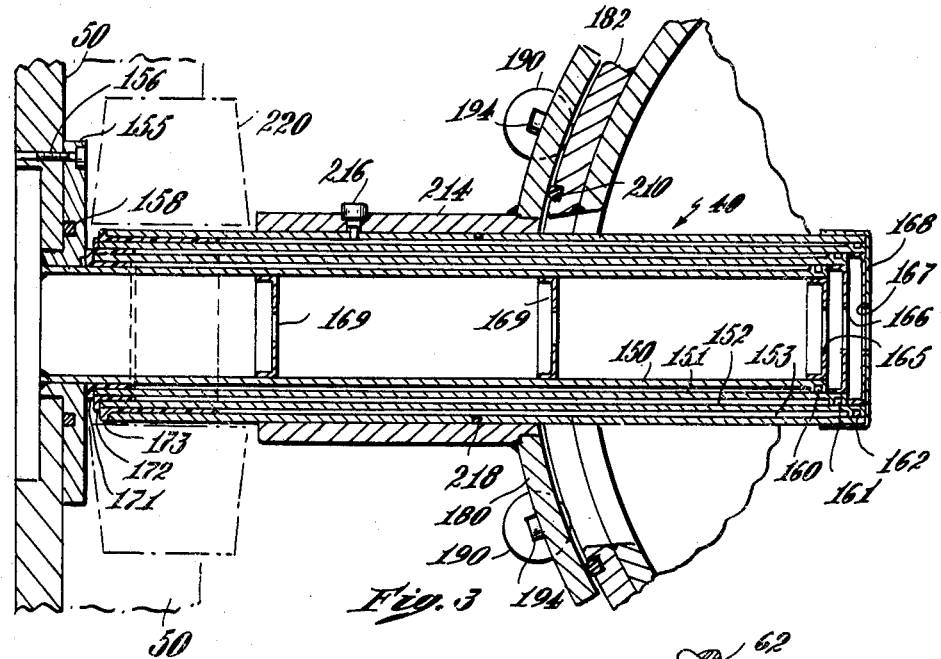
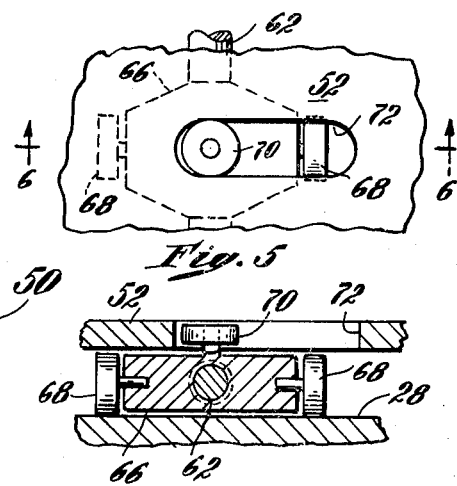
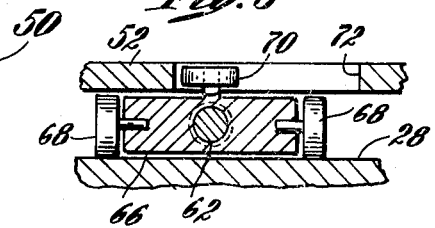
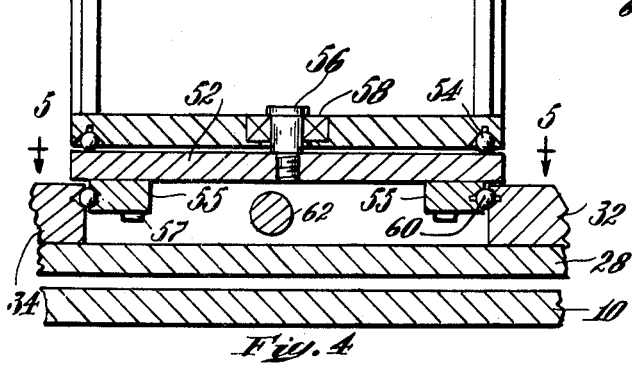

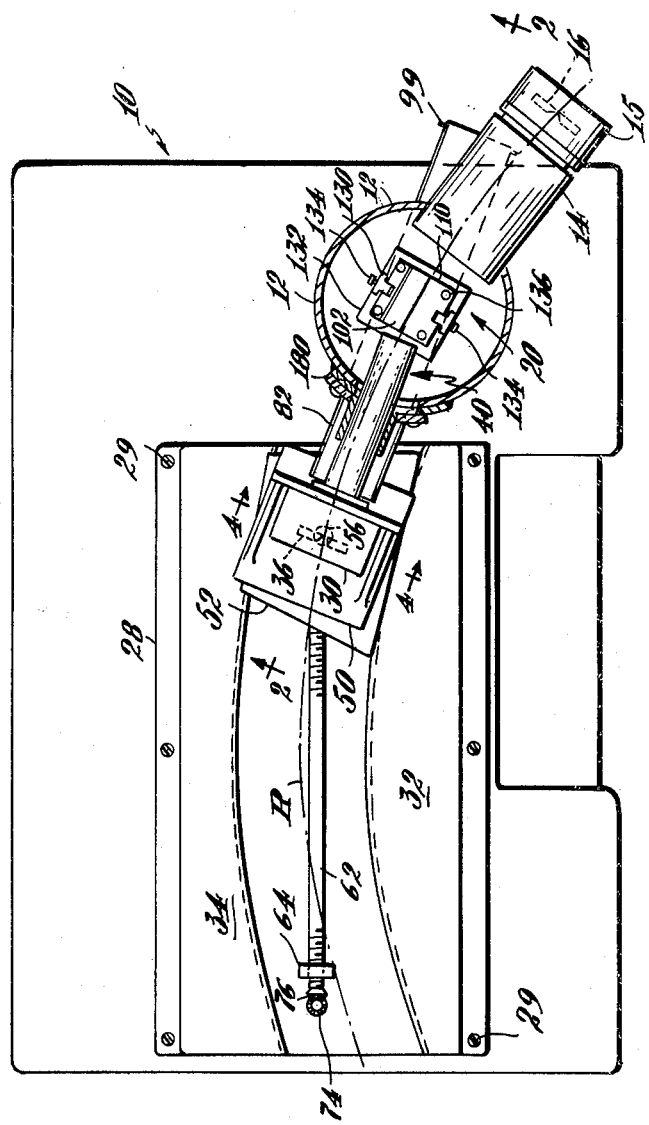

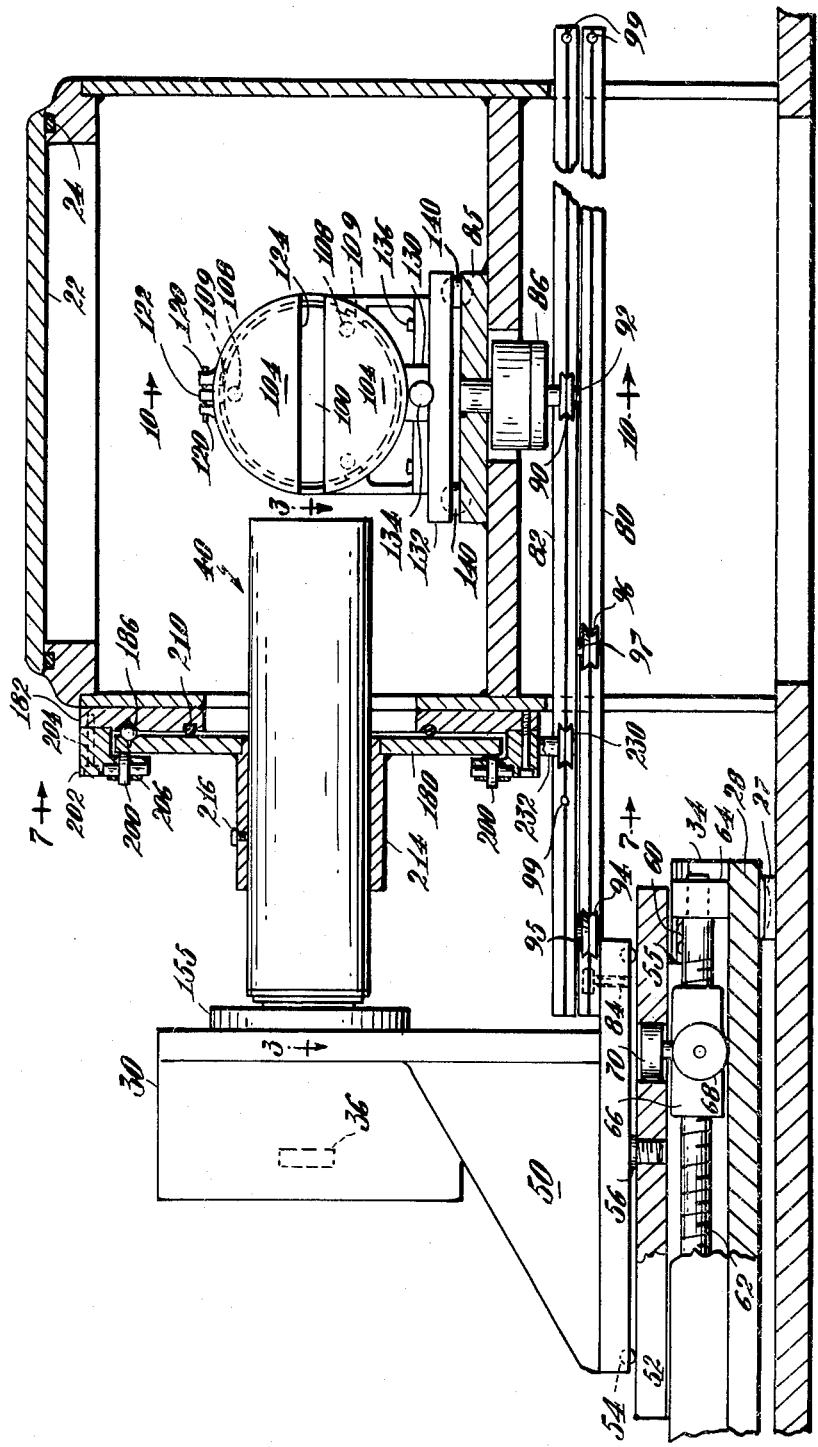

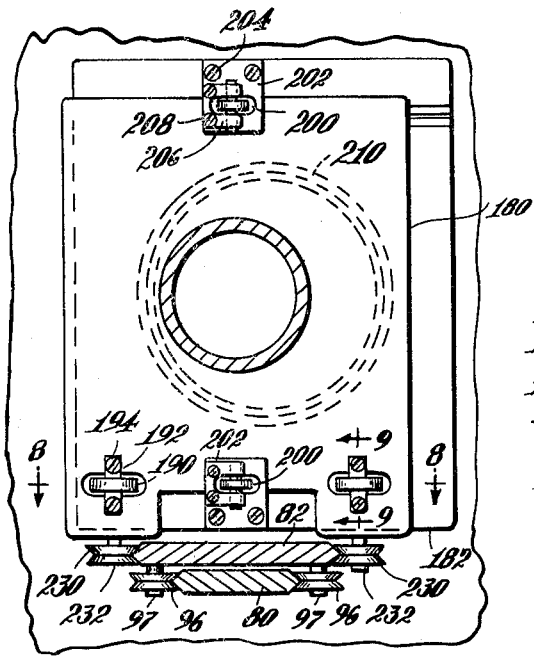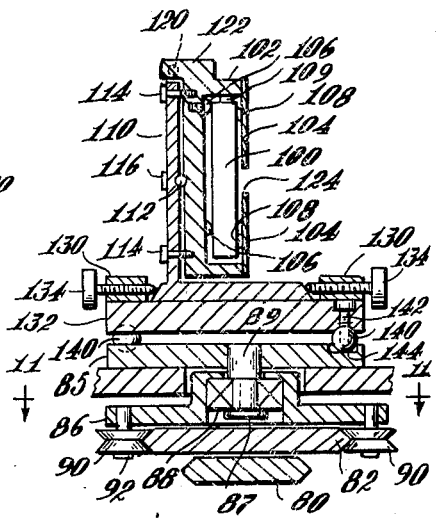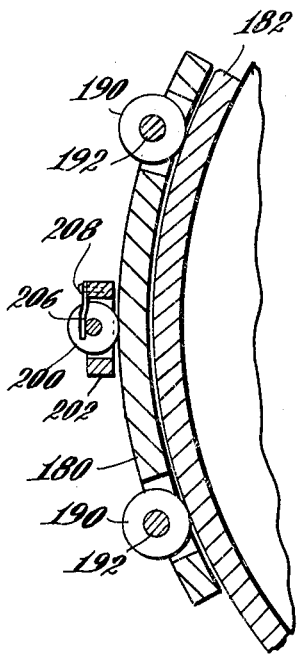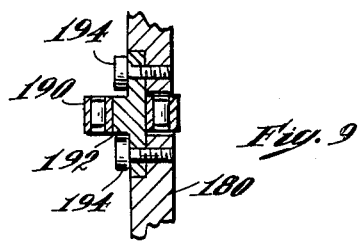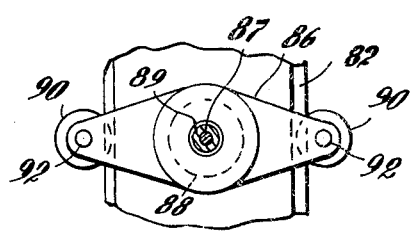

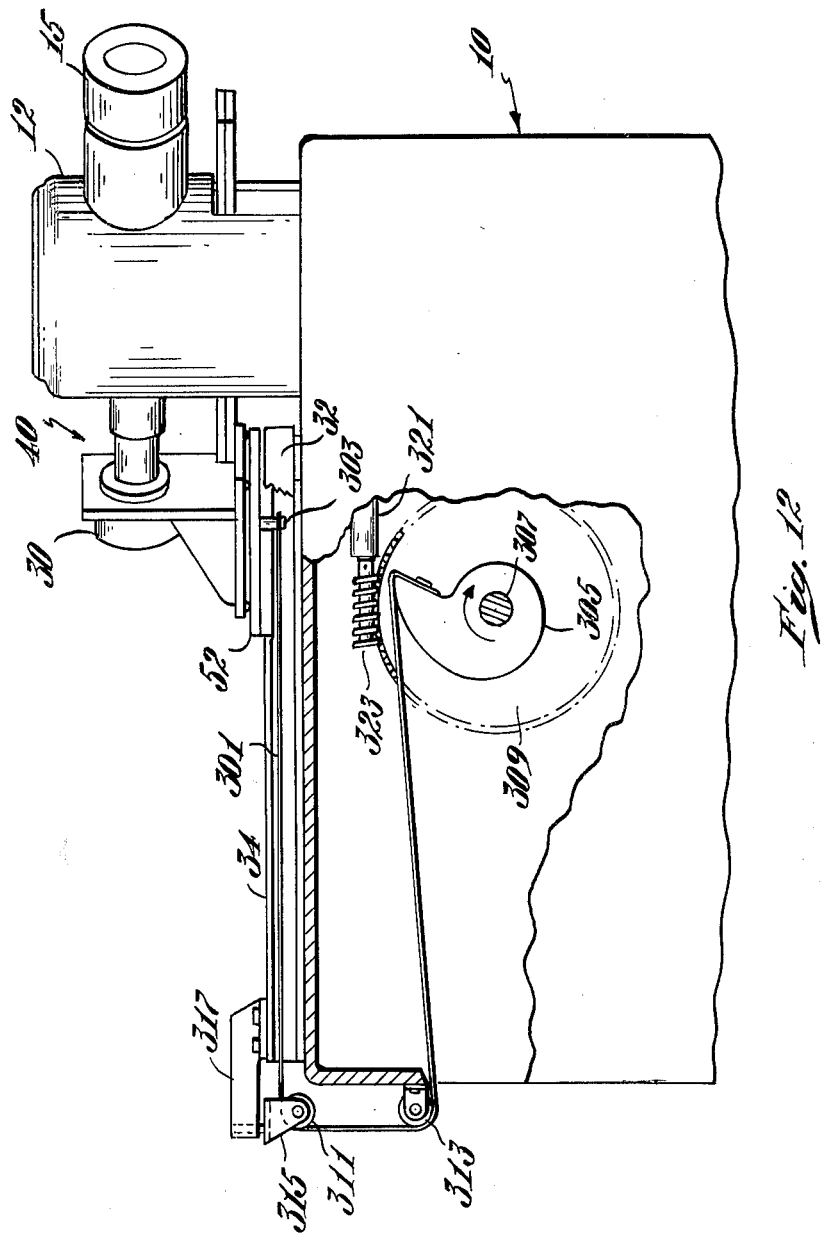

United States Patent Office 3,211,049
Patented Oct. 12, 1965

3,211,049
ULTRAVIOLET MONOCHROMATOR
Paul M. McPherson, Acton, Mass., assignor to McPherson Instrument Corporation, Acton, Mass., a corporation of Massachusetts
Filed Sept. 17, 1962, Ser. No. 224,076
14 Claims. (Cl. 88—14)

This application is a continuation-in-part of my copending application Serial No. 187,775, filed April 16, 1962 and now abandoned.

This invention relates to spectrometric apparatus and more particularly to a grazing incidence, vacuum ultraviolet monochromator.

In the investigation of vacuum ultraviolet spectra it is typically necessary to both avoid the use of glass in transmission or other refractive optical elements and to evacuate all light paths because of the high absorption of both glass and air in these wavelength regions. Ruled gratings are used to disperse the entrance beam according to its various wavelengths and, in order to form focused spectra, it is necessary to utilize concave mirrors or a concave grating.

In the very short wavelength regions, however, even coated mirrors and gratings begin to become absorptive and lose their reflective qualities. One known method of increasing the useful wavelength range of reflective gratings is to have the entrance beam approach the grating at grazing incidence, that is, at a large angle of incidence as conventionally defined with reference to a perpendicular to the illuminated surface. Grazing incidence increases the percentage of light reflected from the grating.

In most concave grating spectrometric systems there is a requirement that, in order to maintain the spectrum in focus on the light-receiving means, the three elements—the entrance aperture, the grating and the light-receiving means—lie on a prescribed circle known as the Rowland circle. The Rowland circle is that circle whose diameter is equal to the radius of curvature of the concave grating and whose center lies midway on a line joining the center of the grating with the center of curvature of the grating.

While grazing incidence spectographs have been built heretofore, the design of a useful monochromator involves many considerations not particularly pertinent in a spectrograph. Important among these considerations are the ease with which the scanning of a spectrum may be accomplished, and the provisions which must be made for coupling energy sources and receivers to the monochromator apparatus. In some situations, such as in the analysis of radiation from plasma experiments, it is necessary to couple the monochromator to a massive and fixed radiation source. In such cases it is highly desirable that both the entrance aperture to the monochromator and the entrance beam be stationary during scanning. At the same time it may be desirable to have convenient access to the exit aperture so that the energy-measuring detectors can be adjusted or interchanged. In other situations however, such as in absorption studies, it is desirable that the exit aperture and exit beam be stationary during scanning so that no relative motion is required between the monochromator and the experiment for which it is providing a monochromatic energy source.

It is also desirable that the arrangement of the instrument permit the substitution of light sources and receivers without opening the entire evacuated volume of the apparatus to the atmosphere so that it must be re-evacuated before reuse.

Accordingly, objects of the present invention are to provide a novel grazing incidence monochromator in which the entrance and exit apertures are easily accessible during operation, which may be simply operated to scan a spectrum, which permits the substitution of light sources and receivers without opening the instrument to the atmosphere, which may be operated so that either the entrance aperture or the exit aperture is stationary during scanning, which is capable of high resolution, and which is reliable in operation.

A further object is to provide such a monochromator in which there is a linear correspondence between wavelength setting and an input scanning function, such as rotation, so that a wavelength reading can be easily and directly made.

For ease in explanation, the monochromator according to the invention will be described with reference to the situation in which the entrance aperture is stationary during scanning although, as will appear in greater detail hereinafter, the alternative situation involves the use of the same stationary structure for the exit aperture.

The monochromator involves a stationary grating, stationary entrance aperture defining means disposed on the Rowland circle defined by the grating, the entrance aperture and the center of the grating defining an entrance optical axis which approaches said grating at grazing incidence, and exit aperture defining means movable along the Rowland circle and pivotable about an axis which passes through the Rowland circle and is parallel to the axis of that circle. The grating is contained within a small evacuable housing into which the entrance aperture opens. A plurality of interfitting tubes extending between the exit aperture defining means and the housing provide an evacuable light path between the grating and the exit aperture.

In one aspect the invention also contemplates that sliding straightedge means extend between the exit aperture defining means and the grating for maintaining the proper orientation of the exit aperture defining means relative to the grating.

In another aspect the housing includes a curved sidewall portion which is substantially concentric with the center of the grating. A curved face plate is slidingly supported over the curved sidewall portion and these elements are correspondingly apertured to permit a light path between the grating and the exit aperture. Preferably, the face plate includes means engaging the straightedge means for maintaining the tubes and the face plate itself in alignment between the exit aperture and the grating without laterally stressing the tubes.

In a still further aspect the monochromator incorporates a means for traversing the exit aperture including a cam and a flexible inextensible band. One end of the band is attached to the exit aperture and the other end is attached to the periphery of the cam, the shape of the cam being such that movement of the exit aperture in response to rotation of the cam produces a change in the wavelength response setting of the monochromator which is linearly related to the rotation of the cam.

For the purpose of illustration a preferred embodiment of the present invention is shown in the accompanying drawings in which:

FIG. 1 is a plan view of a grazing incidence monochromator;

FIG. 2 is a partial section substantially on the line 2—2 of FIG. 1;

FIG. 3 is a section on the line 3—3 of FIG. 2 showing the interfitting tubes with some parts beneath the tubes being omitted;

FIG. 4 is a section on the line 4—4 of FIG. 1 showing the sliding exit aperture mount;

FIG. 5 is a section on the line 5—5 of FIG. 4 showing the exit aperture traversing means;

FIG. 6 is a section on the line 6—6 of FIG. 5;

FIG. 7 is a section on the line 7—7 of FIG. 2 showing the face plate and sliding straightedges with the interfitting tube assembly removed.

FIG. 8 is a section on the line 8—8 of FIG. 7;

FIG. 9 is a section on the line 9—9 of FIG. 7;

FIG. 10 is a section on the line 10—10 of FIG. 2 showing the grating mounting and the straightedge aligning yoke;

FIG. 11 is a section substantially on the line 11—11 of FIG. 10;

FIG. 12 is a front view of a modification illustrating an alternative drive mechanism.

Referring now to the drawings and in particular to FIGS. 1 and 2, the monochromator components are supported on a suitable base 10 into which may be built the associated electronic and vacuum producing apparatus. At the right hand side of the base 10 is a cylindrical vacuum housing 12 into which opens a conventional entrance slit tube 14 and entrance slit asembly 15. The slit jaws defining the entrance aperture itself are indicated diagrammatically at 16. The grating used to disperse the incoming radiation according to its component wavelengths is supported by a suitable stationary mounting 20 so that the center of the grating lies substantially on the vertical axis of the cylindrical housing 12. The center of the grating and the entrance aperture together define an entrance optical axis and the grating is oriented so that the entrance optical axis approaches the grating at grazing incidence, that is the angle between the entrance optical axis and the perpendicular to the grating's surface at its center is greater than 70°. As used hereinafter and in the claims the term "grazing incidence" shall be understood to be so defined. Access to the grating and its mounting 20 may be had through a removable cover plate 22 which is vacuum sealed to the housing 12 by an O-ring 24.

To the left of the housing 12 a conventional exit slit assembly 30 is supported in such a manner as to be movable along the Rowland circle and pivotable about an axis which is parallel to the axis of that circle. The jaws defining the exit aperture are indicated diagrammatically at 36 and the Rowland circle, passing through both the entrance and the exit apertures, is indicated by the broken line R. A set 40 of interfitting tubes provide an evacuable light path between the exit slit assembly 30 and the grating.

As may be seen in FIGS. 2 and 4 the exit slit assembly 30 is attached directly to a bracket 50. The bracket is pivotally mounted on a slide 52 by a circular set of ball bearings 54 which provide a broad base for preventing tipping and a shoulder screw 56 and conventional ball bearing 58 which accurately fix the pivot axis and preload the ball bearings 54. The slide 52 includes V-ways 55 which are secured thereto by screws 57 and races of ball bearings 60 extending between the ways 55 and the ways 32 and 34 permit the slide to travel freely along a path determined by a pair of curved ways 32 and 34 (FIG. 1). The curved ways are secured to a base plate 28 which is in turn mounted on the base 10 by means of screws 29 and self-aligning washers 27. The ways are located so that the vertical pivot axis of the bracket 50 passes always through the Rowland circle and the exit slit assembly 30 is, of course, positioned relative to the bracket 50 so that the pivot axis passes also through the center of the exit aperture defined by the slit jaws 36.

The position of the exit aperture along the Rowland circle is adjustable by means of a precision screw 62 (FIGS. 1 and 2) which is supported at both ends by bearings 64 attached to the base plate 28 between the ways 32 and 34. The screw drives a nut 66 (FIGS. 5 and 6) which is kept from turning with the screw by the engagement of ball bearing wheels 68 with base plate 28. The nut carries on its upper surface a circular ball bearing 70 which rides in a corresponding slot 72 in the slide 52 in such a manner that relative motion is permitted laterally of the screw 62 while movement of the nut along the screw is transmitted to the slide thereby traversing the exit aperture. The screw 62 may be turned from below by any suitable drive mechanism operating through bevel gears 74 and 76. As may be understood from the preceding explanation the exit slit assembly 30 is thus movable along the Rowland circle and pivotable about a vertical axis passing through the Rowland circle.

As it is traversed around the Rowland circle the exit slit assembly 30 is kept oriented relative to the grating by a pair of telescoping straightedges 80 and 82 one of which (80) is rigidly connected to the exit slit bracket 50 as by bolts 84 (FIG. 2) and the other of which (82) slides in a yoke 86 which is pivotally mounted on the housing 12 with its pivot axis coincident with the vertical axis of the grating. As may be best seen in FIGS. 10 and 11 the yoke 86 is pivotally connected, by a screw 87 and a ball bearing 88, to a post 89 welded to a mounting plate 85 set in the floor of the housing 12. The sliding engagement between the yoke 86 and the straightedge 82 is accomplished by V-groove ball bearing rollers 90 which are secured to the outer ends of the yoke 86 by adjustable eccentric studs 92. The two straightedge elements 80 and 82 are maintained telescopingly in alignment by similar rollers 94 and 96 (FIG. 2) which are secured to the straightedge 82 by similar studs 95 and 97 respectively and between which runs the straightedge 80. The straightedges are kept from coming completely apart and from disengaging the yoke 86 by stop pins 99 (FIGS. 1 and 2).

Also from FIG. 10, along with FIGS. 1 and 2, can be seen the particular method of mounting the grating which is advantageously used in the preferred embodiment illustrated. The relatively fragile grating 100 is held within a rigid grating holder 102 by a pair of cover plates 104. The cover plates include three rigid pads 108 which bear against and accurately locate the face of the grating and the grating is held in engagement with these pads by three spring loaded plungers 106 set in the holder 102 in alignment with the pads 108. Three resilient pads 109 position the periphery of the grating relative to the holder. The grating holder 102 is mounted relative to a grating support bracket 110 by a spherical bearing 112 which rests in a conical depression in each of the holder and the bracket and by two pairs of opposed screws 114, 116. Adjustment of the screws 114, 116 provides a means for controlling the attitude of the grating around the two axes extending generally parallel to the grating, the screws 114 working around the horizontal axis and the screws 116 working around the vertical axis. Tangent screws 120 set in the upper part of the bracket 110 and bearing against a tab 122 extending from the upper part of the grating holder 102 provide a means for adjusting the orientation of the grating around the remaining orthogonal axis. The space between the cover plates 104 provides an elongate aperture 124 through which the grating 100 is exposed to the radiation coming from the entrance aperture, the elongate nature of the aperture 124 being required by the shallow angle of incidence.

The bracket 110 is keyed with two guide blocks 130 attached to a mounting plate 132 so as to prevent translational movement of the grating except in a direction towards and from the center of its Rowland circle (FIG. 1). Thumb screws 134 provide a means for adjusting the transverse position of the grating and once the proper position is achieved the bracket 110 can be rigidly secured to the plate 132 by screws 136. This adjustment permits the grating to be brought into proper position relative to the arc traversed by the exit aperture along the ways 32 and 34.

The plate 132 itself is not fixedly attached to the housing 12 but rather three spheres 140 are secured to the plate by three screws 142 and one of these spheres rests in each of a cone, a V-groove and a flat 144 formed in the upper surface of the mounting plate 85. This kinematic mount permits the grating to be removed and reinserted easily without requiring readjustment and permits several preadjusted gratings having the same radius of curvature to be simply and quickly interchanged.

The interfitting tube means which form the evacuable light path between the exit aperture and the grating are shown best in FIG. 3. The assembly involves four similar tubes 150–153, the innermost one of which (150) is rigidly connected to the exit aperture bracket 50 by means of a flange 155 to which the tube 150 is welded and which is itself attached by screws 156 to the bracket 50. An O-ring 158 provides the necessary vacuum seal between the flange and the bracket. The end nearest the grating of each of the three innermost tubes 150–152 is grooved to receive an O-ring 160–162 respectively for establishing the necessary vacuum seal between each of those tubes and the next larger tube. Preferably this end of each of the tubes 150–153 also carries an apertured mask 165–168 for masking scattered radiation. The innermost tube 150 includes additional masks 169 for providing adequate masking when the tube assembly is completely collapsed.

The end nearest the exit slit assembly 30 of each of the three outermost tubes 151–153 carries a nylon bushing 171–173 to keep the tubes properly spaced and aligned. The arrangement of O-rings 160–162 and bushings 171–173 is thus arranged so that the sliding vacuum seals (O-rings) bear against the inner surfaces of the respective tubes while the nylon bushings slide against the outer surfaces. The inner surfaces are less likely to be damaged when the tube assembly is extended and hence more likely to retain the high finish necessary for a perfect vacuum seal.

The tube assembly 40 enters the housing 12 through a sliding face plate 180. The outermost tube 153 of the interfitting tube assembly is attached and oriented by a dog-point screw 216 to a tube 214 that is welded to the sliding face plate 180. The face plate 180 is curved to match a curved plate 182 which is welded to the housing 12 and is slidingly supported in spaced relation thereto by a set of ball bearings 186 and a pair of roller bearing wheels 190. The ball bearings 186 ride in opposed V-grooves in the upper edge of each of the face plate 180 and the plate 182, while the lower edge of the face plate is spaced from the curved plate 182 by the roller bearing wheels 190 whose axles 192 are rigidly connected to the face plate 180 by screws 194 and whose peripheries run on the curved plate 182.

In the absence of sufficient atmospheric pressure loading, the face plate 180 is held against the plate 182 by a pair of rollers 200 located centrally at the top and bottom of the plate 182. These rollers are supported relative to the plate 182 by mounts 202 secured by screws 204. Springs 206, secured to the mount 202 by screws 208, resiliently urge the rollers against the outer surface of the face plate 180.

The face plate 180, the curved plate 182 and the housing 12 are each apertured to allow clearance for tube assembly 40 which provides a light path between the exit aperture and the grating. The inner surface of the face plate 180 is highly finished and an O-ring 210 resting in a groove in the curved plate 182 provides the necessary sliding vacuum seal between the two plates. The quality of this seal is assured by the precisely spaced relationship established by the ball bearings 186 and the roller bearing wheels 190. A vacuum seal is established between tube 214 and the tube 153 by an O-ring 218. Preferably the entire interfitting tube assembly is protected from dirt and scratching by a neoprene bellows which is indicated diagrammatically at 220 (FIG. 3).

In the preferred embodiment shown, the application of lateral stress to the interfitting tube assembly is prevented by a pair of V-groove ball bearing rollers 230 (FIGS. 2 and 7) which are attached to the face plate 180 by adjustable eccentric studs 232 and which engage the upper (82) of the straightedge elements. Since, as was explained previously, the straightedge elements keep the exit slit assembly 30 oriented relative to the grating and are themselves aligned between the exit aperture and the vertical axis of the grating as defined by the yoke 86, the engagement of the rollers 230 with the straightedge 82 serves to maintain the face plate 180 and the tubes 150–153 also in alignment between the exit aperture and the grating without stressing the joints between the tubes.

The operation of the device is apparent from a consideration of the objects of the invention and the apparatus disclosed. Radiation introduced at the stationary entrance aperture is dispersed by the stationary grating 100 according to its component wavelengths. Rotation of the screw 62 traverses the exit slit assembly 30 along the Rowland circle allowing the selection of a precisely focused portion of the spectrum by the exit aperture. The proper orientation of the exit slit assembly 30 in relation to the grating is maintained by the telescoping straightedges. Through the operation of the tube assemblies, both the entrance and the exit apertures are vacuum connected to the vacuum housing 12 and yet are accessible from outside of the evacuated volume thereby permitting the easy exchange of radiation sources and receivers. Further, owing to the cooperation between the straightedges and the face plate-tube assembly, the interfitting tubes are maintained in such perfect alignment that a very close masking of the exit beam can be obtained thereby greatly reducing the problems created by scattered radiation.

In its operation as above described with a stationary entrance aperture the monochromator obviously has utility in experiments in which the radiation from a large and immovable device must be analysed. On the other hand however, it is also possible, by interchanging the slit assemblies 15 and 30, to operate this apparatus with the monochromatic radiation emerging from the now stationary exit aperture, this aperture being in fact located at the same position that the entrance aperture occupied in the above detailed description. In such operation a small, high intensity energy source is attached to the entrance slit assembly 15 which now rides on the bracket 50 along the curved ways 32 and 34. The radiation from this source is dispersed by the grating 100 and a selected portion of the spectrum is passed by the exit aperture which is in the stationary position. While this mode of operation does not maintain a constant angle of incidence during scanning, it should be noted that the angle of incidence becomes greater as shorter wavelengths are scanned. This operation, of course, is highly desirable since it enhances the increase in reflectivity of the grating obtained by utilizing grazing incidence.

It should also be noted that, in both modes of operation, the grating and the Rowland circle are stationary which greatly simplifies initial adjustment of the apparatus. Further, since the grating chamber is stationary, it provides a central point at which vacuum pumping may be advantageously applied.

While the leadscrew 62 provides an excellent means for precisely positioning the movable aperture along the Rowland circle, the relation of wavelength to screw rotation is such a complex function that the actual wavelength setting must typically be determined from a prepared table rather than read directly from the apparatus. The modification illustrated somewhat diagrammatically in FIG. 12 incorporates a novel drive mechanism which provides linear correspondence between wavelength setting and a rotational input function. In this modification the slide 52 is drawn along the curved ways 32 and 34 by a thin steel tape 301 which is pivotally connected to the slide by pin 303. The tape 301 is in turn pulled by the periphery of a decreasing radius cam 305. The cam is mounted on a shaft 307 which also carries a worm gear 309 and which is journaled in the base 10.

The tape 301 is directed from the slide 52 to the cam 305 by two pulleys 311 and 313. The support 315 for the pulley 311 is pivotally mounted on a bracket 317 in such a manner that the pulley 311 is free to pivot about an axis which is perpendicular to the Rowland circle and which is tangent to the periphery of the roller 311. In this way translation of the slide 52 along the Rowland circle produces only twist in the tape 301, this twist occurring between the rollers 311 and 313, and does not introduce any bending of the tape in its own plane which would inelastically deform the tape.

The cam 305 is driven through a shaft 321 carrying a worm 323 which engages the worm gear 309. The cam 305 is shaped so that the wavelength setting of the monochromator is linearly related to the angular position of the shaft 321, the steel tape 301 providing a flexible, inelastic band joining the slide 52 and the periphery of the cam. In that the upper portion of the tape 301 chords the Rowland circle and the lower portion approaches the cam periphery at changing angles, the cam shape is relatively complex and is best determined graphically for each embodiment into which it is incorporated.

As the rotation of the shaft 321 is, through the operation of the cam 305, linearly related to changes in the wavelength setting of the monochromator, an ordinary counter coupled to the shaft 321 through appropriate gearing may be made to read wavelengths directly.

A further advantage of this drive, as used with the monochromator illustrated herein, is that its mechanical advantage increases as the load on the slide 52 increases. The load increases because, as the movable aperture is drawn outwardly from the chamber 12, successive ones of the tubes 150–153 must be drawn out against atmospheric pressure. To provide a bias force against which the tape 301 may draw in the absence of a vacuum in the system, it will typically be desirable to provide some sort of resilient spring means (not shown) for urging the movable aperture toward the chamber 12.

While particular forms of the apparatus have been disclosed in detail by way of illustration, it should be understood that the invention includes all modifications and equivalents falling within the scope of the appended claims.

I claim:

1. A grazing incidence monochromator comprising: an evacuable housing; a grating fixed relative to said housing, said grating defining a Rowland circle; stationary aperture defining means disposed on said Rowland circle, the aperture and the center of said grating defining an optical axis which approaches said grating at grazing incidence; means for providing an evacuable light path between said stationary aperture defining means and said housing; second aperture defining means movable along said Rowland circle and pivotal about an axis which passes through said Rowland circle and is parallel to the axis of said circle; sliding straightedge means extending between said movable aperture defining means and said grating for maintaining the movable aperture properly oriented with respect to said grating; and a plurality of concentrically interfitting tube means extending between said movable aperture defining means and said housing for providing an evacuable light path between said movable aperture and said grating.

2. A monochromator according to claim 1 including means attached to the end one of the interfitting tube means nearest the grating and engaging said sliding straightedge means for maintaining said plurality of tube means in alignment between the movable aperture and the grating.

3. A grazing incidence monochromator comprising: a stationary concave grating, said grating defining a Rowland circle; stationary aperture defining means disposed on said Rowland circle; the aperture and the center of said grating defining an optical axis which approaches said grating at grazing incidence; an evacuable housing having a curved sidewall portion which is substantially concentric with the center of said grating; means for providing an evacuable light path between said stationary aperture defining means and said housing; second aperture defining means movable along said Rowland circle and pivotable about an axis which passes through said Rowland circle and is parallel to the axis of said circle; a curved face plate slidingly supported in spaced relation to said curved sidewall portion of the housing, said face plate and said sidewall portion being correspondingly apertured to permit a light path between said grating and the movable aperture; means providing a sliding vacuum seal between said face plate and said sidewall portion around the corresponding apertures; sliding straightedge means extending between said movable aperture defining means and the vertical axis of said grating for maintaining the movable aperture properly oriented with respect to said grating; a plurality of concentrically interfitting tube means extending between said movable aperture defining means and said face plate for providing an evacuable light path between the movable aperture and said grating; and means attached to said face plate and engaging said straightedge means for maintaining said face plate and said tube means in alignment between the movable aperture and said grating without laterally stressing said tube means.

4. A monochromator according to claim 3 including means for traversing said movable aperture defining means along said Rowland circle.

5. A grazing incidence monochromator comprising: an evacuable housing; a concave grating fixed relative to said housing, said grating defining a Rowland circle; stationary aperture defining means disposed on said Rowland circle, the aperture and the center of said grating defining an optical axis which approaches said grating at grazing incidence; means for providing an evacuable light path between said stationary aperture defining means and said housing; a set of curved ways concentric with said Rowland circle; a slide carried on said ways; second aperture defining means pivotally mounted on said slide so that the pivot axis is perpendicular to the plane of dispersion of said grating and passes through both said Rowland circle and the center of the movable aperture; sliding straightedge means extending between said movable aperture defining means and the vertical axis of said grating for maintaining the movable aperture properly oriented with respect to said grating; and a plurality of concentrically interfitting tube means extending between said movable aperture defining means and said housing for providing an evacuable light path between the movable aperture and said grating.

6. A monochromator according to claim 5 including means for traversing said slide along said ways.

7. A monochromator according to claim 6 in which the means for traversing said slide includes a screw and a nut which threadedly engages said screw and slidingly engages said slide so as to transmit movement along said ways.

8. A monochromator according to claim 6 in which said means for traversing said slide includes a cam and a flexible inextensible band one end of which is attached to said slide and the other end of which is attached to the periphery of said cam, the shape of said cam being such that movement of said second aperture defining means in response to rotation of said cam produces a change in the wavelength response setting of the monochromator which is linearly related to the rotation of the cam.

9. A grazing incidence monochromator comprising: a stationary concave grating, said grating defining a Rowland circle; stationary aperture defining means disposed on said Rowland circle, the aperture and the center of said grating defining an optical axis which approaches said grating at grazing incidence; an evacuable housing having a curved sidewall portion which is substantially concentric with the center of said grating, the radius of curvature of said sidewall portion being smaller than the distance between said grating and said aperture; means for providing an evacuable light path between said stationary aperture defining means and said housing; second aperture defining means movable along said Rowland circle and pivotable about an axis which passes through the Rowland circle and is parallel to the axis of said circle; a curved face plate slidingly supported in spaced relation to said curved sidewall portion, said face plate and said sidewall portion being correspondingly apertured to permit a light path between said grating and the movable aperture; means providing a sliding vacuum seal between said face plate and said sidewall portion around the corresponding apertures; straightedge means one end of which is rigidly connected to said movable aperture defining means; a yoke pivotally connected to the housing on the vertical axis of said grating and slidingly engaging said straightedge means; a plurality of concentrically interfitting tube means extending between said movable aperture defining means and said face plate for providing an evacuable light path between the movable aperture and said grating; and a second yoke means attached to said face plate and slidingly engaging said straightedge means for maintaining said face plate and said tube means in alignment between the grating and the movable aperture without laterally stressing said tube means.

10. A monochromator according to claim 9 in which the straightedge means are longitudinally collapsible so as to reduce the projection of said straightedge means beyond said housing when the movable aperture is in central image position.

11. A grazing incidence monochromator comprising: a stationary concave grating, said grating defining a Rowland circle; stationary aperture defining means disposed on said Rowland circle; the aperture and the center of said grating defining an optical axis which approaches said grating at grazing incidence; and evacuable housing having a curved sidewall portion which is substantially concentric with the center of said grating; means for providing an evacuable light path between said stationary aperture defining means and said housing; second aperture defining means movable along said Rowland circle and pivotable about a vertical axis which passes through said Rowland circle and is parallel to the axis of said circle; a curved face plate slidingly supported in spaced relation to said curved sidewall portion, said face plate and said sidewall portion being correspondingly apertured to permit a light path between the grating and the movable aperture; means providing a sliding vacuum seal between said face plate and said curved sidewall portion; and a plurality of concentrically interfitting tube means one end of which is rigidly connected to said movable aperture defining means and the other end one of which is rigidly connected to said face plate for providing an evacuable light path between the movable aperture and said grating.

12. A grazing incidence monochromator comprising: an evacuable housing; a grating fixed relative to said housing, said grating defining a Rowland circle; stationary aperture defining means disposed on said Rowland circle, the aperture and the center of said grating defining an optical axis which approaches said grating at grazing incidence; means for providing an evacuable light path between said stationary aperture defining means and said housing; second aperture defining means movable along said Rowland circle and pivotal about an axis which passes through said Rowland circle and is parallel to the axis of said circle; and collapsible tube means extending between said second aperture defining means and said housing for providing an evacuable light path between the movable aperture and said grating.

13. A monochromator according to claim 12, further comprising means for causing second aperture defining means to always face said grating.

14. In a grazing incidence ultraviolet monochromator of the type having a fixed grating and in which one aperture defining means traverses the Rowland circle during scanning, a drive for the aperture defining means comprising: a rotatable cam; and a flexible and inextensible thin tape one end of which is attached to said aperture defining means and the other end of which is attached to the periphery of said cam, the shape of said cam being such that movement of said aperture defining means in response to rotation of said cam produces a change in the wavelength setting of the monochromator which corresponds linearly to the rotation of the cam, said drive including a pulley for said tape and a support for said pulley, which support is pivotable about an axis perpendicular to the plane of said Rowland circle and passing tangent to the periphery of said pulley, said tape extending from said aperture defining means in a plane parallel to said Rowland circle and over said pulley leaving in a direction perpendicular to the plane of said Rowland circle, whereby movement of said aperture defining means around said Rowland circle does not produce bending of the tape in its own plane.

References Cited by the Examiner

UNITED STATES PATENTS

| 2,480,865 | 9/49 | Lofstrand | 74—222 |
| 3,123,710 | 3/64 | Neuhaus | 250—51.5 |

FOREIGN PATENTS

| 1,286,325 | 1/62 | France. |
| 913,451 | 12/62 | Great Britain. |

JEWELL H. PEDERSEN, *Primary Examiner.*